United States Patent Office 3,425,798
Patented Feb. 4, 1969

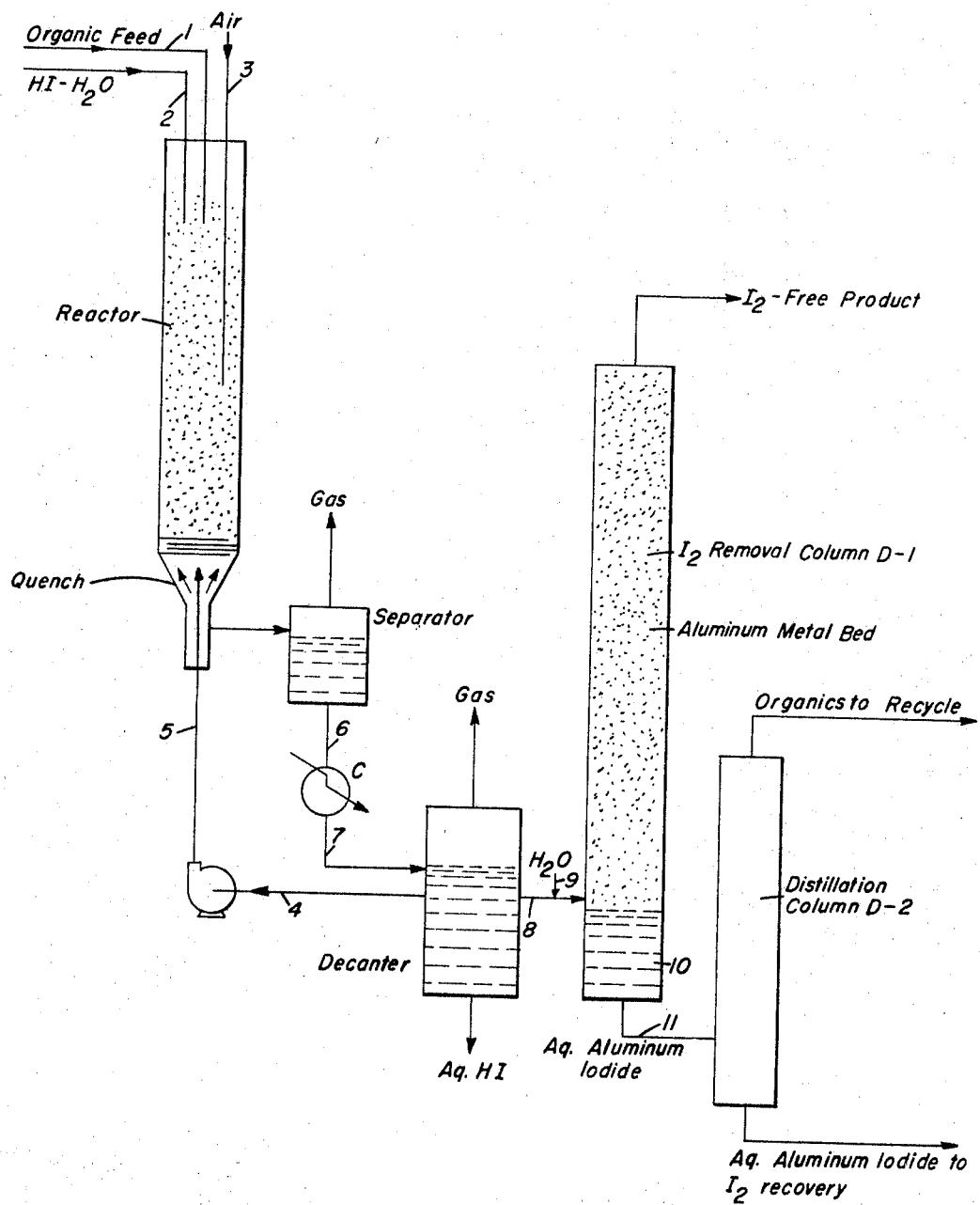

3,425,798
PROCESS FOR THE REMOVAL OF IODINE FROM ORGANIC COMPOUNDS
Max Statman, Alden E. Blood, and Herschel Thomas Vinyard, Longview, Tex., assignors to Eastman Kodak Company, Rochester, N.Y., a corporation of New Jersey
Filed Jan. 10, 1966, Ser. No. 519,635
U.S. Cl. 23—91
Int. Cl. C01f 7/48, 5/26; C01g 9/04
15 Claims

ABSTRACT OF THE DISCLOSURE

Aluminum, magnesium or zinc metal can be used to remove small amounts of dissolved iodine from organic compounds or their mixtures.

---

This invention relates to a process for the removal of iodine from organic compounds and more particularly to the removal of iodine from unsaturated organic compounds produced in an oxidative dehydrogenation process.

In the Blood et al. U.S. patent application Ser. No. 388,196 of Aug. 7, 1964, is described a process for the oxidative dehydrogenation of organic compounds in which the organic compounds are heated in the presence of oxygen and hydrogen iodide hydrate as opposed to anhydrous hydrogen iodide. For example, an ester such as methyl isobutyrate is oxidatively dehydrogenated to obtain methyl methacrylate. The process is characterized by the production of unsaturated compounds substantially free of iodine, as opposed to previously known oxidative dehydrogenation processes using iodine and oxygen. In the mentioned process using hydrogen iodide hydrate operating at temperatures of the order of 500° to 600° C., hydrogen iodide, oxygen and the organic compound do not react to yield a product containing iodine. However, after the dehydrogenation is complete, a small amount of iodine may be formed and dissolved in the unsaturated product through oxidation of the hydrogen iodide by oxygen present in the air when the temperature of the reaction mixture is lowered to facilitate processing of the product. Known processes for the removal of iodine species from organic compounds such as the use of copper in the process described in U.S. Patent 3,119,881, have been investigated but not found to be useful in our processes as will be described in more detail in the examples below.

We have discovered that iodine can be removed from compositions containing organic compounds by passing the compositions through a bed of metallic aluminum, magnesium or zinc in the presence of water to convert the iodine to metallic iodide which dissolves in the water and can be readily separated from the iodine-free organic compound. Aluminum is preferred, particularly because of its higher reactivity with iodine species under the conditions of operation. Alloys of these metals containing minor amounts of other metals, e.g. aluminum-copper alloy containing about 10% copper can be used, but tend to form inert solids which should be removed from the system.

The accompanying drawing is a flow diagram illustrating our invention. In a representative process shown in the drawing, organic compound, hydrogen iodide hydrate and air are introduced into the reactor and heated to effect oxidative dehydrogenation of the organic compound. The effluent from the reactor, after quenching, is passed through the liquid-gas separator to the decanter, the supernatant layer obtained containing unsaturated organic product being passed upward through a column containing a bed of aluminum turnings and iodine-free product stream is taken off the top of the column. The aluminum iodide formed in the aluminum bed dissolves in the water contained in the rising organic stream, moves down the column and is drawn off at the bottom for distallation to strip out dissolved organic compounds before recovery of the iodine from the aluminum iodide.

The described process is useful for the removal of iodine from a wide variety of organic compositions and not necessarily from only compounds produced in an oxidative dehydrogenation process. These compounds include water-soluble or water-insoluble organic compounds; saturated or unsaturated organic compounds; aliphatic or aromatic compounds as described in more detail below. In the case of the removal of iodine from compositions containing water-insoluble organic compounds, the process is efficiently carried out as described above and illustrated in the drawing, a stream containing the water-in-soluble organic compounds, traces of iodine and water being passed upward through the metal bed, the iodine-free compound being collected overhead from the column and the aqueous metal iodide being drawn off the bottom for the recovery of the iodine. The amount of water present will depend largely upon the amount of iodine in the organic stream to be converted to the metal iodide and sufficient to assure maintaining an adequate downward flow of the resulting aqueous solution of metal iodide as the organic stream rises through the bed. In batch operation, the organic compound, metal particles and water can be thoroughly mixed in a suitable vessel, allowed to settle, the iodine-free compounds then being decanted off, the metal and aqueous iodide solution being separated in a convenient manner.

In the removal of iodine from water-soluble organic compounds, an aqueous solution of the organic compound is passed through the metal bed such as aluminum, magnesium or zinc, and distillation used for separation of the organic compound from the metal iodide. However, it is preferable to alter the process shown in the drawing somewhat whereby the decanter is dispensed with and the quenched effluent from the gas-separator is distilled to remove the bulk of the aqueous hydrogen iodide and the remaining wet organic product is then passed through the metal bed. When the water-soluble organic product is an acid, the bed contains aluminum in preference to zinc or magnesium. Otherwise one or more of these three metals can be used in the metal bed.

The process for iodine removal can be operated at temperatures of from about 20° to 80° C. under atmospheric pressure. At appreciably higher temperature, water in the system boils which tends to disturb the smooth flow of the metal iodide down the column. In addition, metal salt may be entrained in the vapor stream passing out of the column and cause contamination of the iodine-free product. Temperatures in excess of 80° to 100° C. can be used when the process is operated under elevated pressure. Conversely, if the metal bed is operated under sub-atmospheric pressure, the product stream should be passed through the bed at temperatures below about 80° C. to prevent boiling. The vessel holding the metal bed should be constructed of non-corrosive material such as glass, glass-lined metal, or other ceramic-lined metal. The exit lines from the vessel are preferably constructed of stainless steel.

When the iodine removal process described is particularly adapted to removal of traces of iodine from the organic products of the oxidative dehydrogentation process illustrated in the drawing, the aqueous solution of metal halide drawn off the metal bed is advantageously first stripped of organic compounds by distillation, before recovery of the iodine from the metal halide. This step is desirable because the iodine is subsequently recovered by chlorination of the metal iodide and the chlorination process is adversely affected if the organic compounds are present.

The processes of our invention, particularly as adapted to an oxidative dehydrogenation process, will now be illustrated with particular reference to the accompanying drawing.

Example 1

A stream of methyl isobutyrate to be dehydrogenated is fed through line 1 into a heated ceramic-lined reactor, packed with siliceous material, e.g., pieces of silicon carbide and mixed with an aqueous solution of hydrogen iodide hydrate containing about 20% hydrogen iodide entering the reactor through line 2. The resulting mixture contacts the stream of air entering through line 3 at a point in the reactor where the temperature is about 450° to 650° C. The molar ratio of the methyl isobutyrate to oxygen is about 6:1. The product stream is quickly quenched upon entering the zone at the bottom of the reactor, using a cooled spray of preferably the organic product recycled from the decanter through lines 4 and 5, so as to reduce the temperature of the product stream to about 20° to 80° C. The quenched stream is then passed into the liquid-gas separator, the gas going to a scrubber for recovery of entrained organic material. The condensed effluent is then passed through line 6 to cooler C and through line 7 into the decanter where the effluent separates into an upper water-insoluble organic layer and a lower layer containing aqueous hydrogen iodide which is eventually recycled to the reactor. The composition of a typical organic layer is 73.5 parts methyl isobutyrate, 15 parts methyl methacrylate, 10 parts isobutyric acid, 1.5 part water and .05 part iodine. Small amounts of methyl iodide, acetone, methyl alcohol and methyl acrylate may also be present. The organic layer is then passed through line 8 into the iodine removal column D-1. The column is made of glass, packed with aluminum turnings and externally heated so as to maintain a temperature of about 30° C. Water is introduced through line 9 as needed, so as to maintain sufficient water in the organic stream to dissolve all metal iodide formed in the metal bed. Accordingly, if the product from the decanter is dry, water is introduced into the stream as it enters the bed. The organic stream containing iodine rising through the column contacts the aluminum metal and forms aluminum iodide which dissolves in the water and flows down the column forming a colorless aqueous aluminum iodide layer 10 at the bottom of the column. The contact time between the metal and the organic product stream is only a few minutes, but this can be expected to vary considerably depending in part upon the amount of iodine to be removed, the reactivity of the metal used and the area of metal surface contacted, etc. The iodine-free product stream is taken overhead from the column and typically contains less than 40 parts per million of metal salts and is processed to recover the methyl methacrylate and recycle the unreacted methyl isobutyrate.

The aqueous layer 10 at the bottom of the column is free of iodine and typically contains about 15% aluminum iodide depending on the amount of water used in the column. The layer is drawn off the bottom of the column through line 11 and is stripped of organic material overhead in the distillation column D-2 operating at a temperature of about 99° C., since the organic material interferes with the subsequent chlorination step. After the aqueous layer drawn off the bottom of column D-2 is treated with sufficient chlorine (stoichiometric) to precipitate iodine crystals which can be filtered off and used to prepare additional hydrogen iodide hydrate for use in the primary oxidative dehydrogenation reaction. For example, an organic feed stream containing 30 g. of iodine as aluminum iodide after treatment with chlorine yielded 29.87 g. of iodine crystals.

Example 2

The procedure in Example 1 was carried out in identical manner, except that the metal employed in the iodine removal column D-1 was zinc instead of aluminum. The top organic effluent from the column was iodine-free. The aqueous zinc iodide drawn off the bottom of the column is stripped of organic material in column D-2 and the bottom product chlorinated to yield a quantitative amount of iodine crystals.

Example 3

The same conditions were employed in the process of Example 1, except using magnesium in the metal bed in place of aluminum. The results were identical, iodine being completely removed from the effluent from the reactor.

Example 4

The process of Example 1 is repeated, except using iron turnings in the metal bed instead of aluminum. The top organic effluent was red in color and contained 0.0492 part of free iodine. No water layer formed at the bottom of the column. The organic material recovered from the top and the bottom of the metal bed contained no metal iodide.

Example 5

A glass column was filled with 200 ml. of copper turnings. A mixture of 90 parts of methyl isobutyrate, 10 parts isobutyric acid and 0.25 part iodine was saturated with water and fed over the metal bed at a rate to give 20 minutes contact time. The reactor temperature was held at 29° C. No water layer formed. The top organic effluent was deep green in color, contained copper isobutyrate, and contained 0.05% iodine as copper iodide. After two hours' operation, the copper turning acquired a visible coating that ranged in color from gray at the top of the bed to dark brown at the bottom.

Example 6

The conditions of Example 5 were repeated with a metal bed temperature of 50° C. Over a four-hour run no water layer formed, the top organic effluent was very deep green, and contained copper isobutyrate and 0.06% iodine as copper iodide.

Examples 7–12

The organic materials tabulated below were treated in an aluminum bed under the conditions outlined in Example 1. In each case an aqueous layer separated from the organics was stripped and chlorinated to yield quantitative amounts of free iodine. The organic phase leaving the top of the aluminum bed was colorless in each case. The feed for this group of examples consisted of 0.5 part iodine, 1.5 parts water, 10 parts isobutyric acid, 75 parts of Material "A" and 15 parts of Material "B."

| Example | Material "A" | Material "B" |
|---|---|---|
| 7 | Ethylbenzene | Styrene. |
| 8 | Cumene | α-Methylstyrene. |
| 9 | Cyclohexane | Benzene. |
| 10 | Isobutane | Isobutylene. |
| 11 | Methyl-2-methylpentanoate | Methyl-2-methylpentenoate. |
| 12 | Methyl-2-ethylhexanoate | Methyl-2-ethylhexenoate and isomers. |

Accordingly, the unsaturated products Material "B" of the table may be obtained by oxidative dehydrogenation of the corresponding Material "A." For example, styrene prepared from ethyl benzene in the process described in Example 1 is passed through the aluminum, magnesium or zinc metal bed for complete removal of dissolved iodine. In case Material "A" is a fairly low boiling compound such as butane or isobutane, for the production butylene or isobutylene, the reactor, separator, decanter and metal bed should be held under a pressure of about 60 p.s.i.g. to maintain a liquid phase.

The iodine removal process described is particularly useful in the oxidative dehydrogenation processes such as described in Example 1, employing organic compounds containing an alkyl chain of at least two carbon atoms, especially lower alkyl esters of lower aliphatic monobasic acids of at least three carbon atoms. For example, when preparing methyl methacrylate from methyl isobutyrate, methyl acrylate from methyl propionate or methyl-2-methyl pentenoate from methyl-2-methylpentanoate, the iodine can be removed in the manner described.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. A process for the removal of iodine from an organic composition containing iodine dissolved therein which comprises contacting the organic composition with metallic aluminum, zinc or magnesium in the presence of water at a temperature corresponding to a range at atmospheric pressure of about 20° to about 80° C., to convert the iodine to a water solution of the iodide of said metal, and separating the resulting iodine-free organic composition from the metal iodide.

2. A process for the removal of iodine from an organic composition containing iodine dissolved therein which comprises contacting the organic composition with metallic aluminum, zinc or magnesium in the presence of water at a temperature corresponding to a range at atmospheric pressure of about 20° to about 80° C., to convert the iodine to a water solution of the iodide of said metal, separating the resulting iodine-free organic composition from the metal iodide, chlorinating the iodide and recovering the iodine formed.

3. The process of claim 1 wherein the organic composition containing iodine dissolved therein is water-insoluble, the treatment with the metal causing the metal iodide to form, dissolve in the water and separate from the organic composition in an aqueous phase.

4. In a process for producing unsaturated organic product by oxidative dehydrogenation of an organic compound wherein the organic compound is heated with hydrogen iodide hydrate in the presence of oxygen and the resulting gaseous unsaturated organic product is rapidly cooled whereby the resulting liquid unsaturated organic product contains a small amount of iodine dissolved therein, the steps of contacting the liquid unsaturated organic product with metallic aluminum, zinc or magnesium in the presence of water at a temperature corresponding to a range at atmospheric pressure of about 20° to about 80° C. to convert the iodine to a water solution of metal iodide and separating iodine-free unsaturated organic product from the metal iodide.

5. The process of claim 4 wherein aluminum metal is used.

6. The process of claim 4 wherein the unsaturated organic product containing iodine dissolved therein is water-insoluble and contact with the metal causes metal iodide to form, dissolve in the water and separate from the product in an aqueous phase.

7. A process for the removal of iodine from an unsaturated organic composition containing iodine dissolved therein which comprises contacting the organic composition with metallic aluminum, zinc or magnesium in the presence of water at a temperature corresponding to a range at atmospheric pressure of about 20° to about 80° C., to convert the iodine to a water solution of the iodide of said metal, separating iodine-free unsaturated product from the metal iodide, chlorinating the metal iodide and recovering the iodine formed.

8. The process of claim 4 wherein the organic compound to be dehydrogenated contains an alkyl chain of at least two carbon atoms.

9. The process of claim 4 wherein the organic compound to be dehyrogenated is an ester of a monobasic aliphatic acid of at least three carbon atoms.

10. In a process for producing methyl methacrylate by oxidative dehydrogenation wherein methyl isobutyrate is heated with hydrogen iodide hydyrate and oxygen to produce a gaseous methyl methacrylate composition and said methyl methacrylate composition is rapidly cooled to produce a liquid methyl methacrylate composition containing a small amount of iodine dissolved therein; the steps of contacting the liquid methyl methacrylate composition with metallic aluminum, zinc or magnesium in the presence of water at a temperature corresponding to a range at atmospheric pressure of about 20° to about 80° C. to convert the iodine to an aqueous solution of metal iodide, and separating the resulting iodine-free methyl methacrylate from the solution of metal iodide.

11. The process of claim 10 wherein the water solution of metal iodide is chlorinated and the resulting iodine is recovered.

12. In a process for producing methyl methacrylate by oxidative dehydrogenation wherein methyl isobutyrate is heated with hydrogen iodide hydrate and oxygen to produce a gaseous reaction effluent comprising methyl methacrylate; and the temperature of said gaseous effluent is lowered whereby iodine forms and becomes dissolved in the resulting liquid mixture; the steps which comprise:
    (a) contacting the liquid mixture containing dissolved iodine with metallic aluminum, zinc or magnesium in the presence of water at a temperature corresponding to a range at atmospheric pressure of about 20° to about 80° C. whereby an aqueous metal iodide solution is formed;
    (b) separating said aqueous metal iodide solution from said methyl methacrylate composition by distillation;
    (c) chlorinating said metal iodide and recovering the resulting iodine.

13. The process of claim 10 wherein the liquid methyl methacrylate composition contacting the metal comprises methyl methacrylate, methyl isobutyrate, isobutyric acid, water and dissolved iodine.

14. The process of claim 1 wherein a stream of the organic compound containing iodine dissolved therein, is passed upward through a bed of the metal in the presence of an amount of water sufficient to form a water solution of the metal iodide formed, the solution is collected at the bottom of the bed and a stream comprising iodine-free organic compound is collected overhead.

15. The process of claim 4 wherein a stream of the liquid unsaturated organic compound containing iodine dissolved therein is passed upward through a bed of the metal in the presence of an amount of water sufficient to form a water solution of the metal iodide formed, the solution is collected at the bottom of the bed and a stream comprising iodine-free unsaturated organic compound is collected overhead.

References Cited

UNITED STATES PATENTS

| | | | |
|---|---|---|---|
| 1,314,715 | 9/1919 | Storey | 23—97 |
| 1,916,094 | 6/1933 | Curtin et al. | 23—217 |
| 2,246,645 | 6/1941 | Urbain et al. | 23—217 |
| 2,719,171 | 9/1955 | Kalb | 260—486 |
| 2,780,528 | 2/1957 | Fossan et al. | 23—216 |
| 2,901,520 | 8/1959 | Raley et al. | 260—683.3 X |
| 2,921,013 | 1/1960 | Mullineaux et al. | 260—673.5 XR |
| 3,000,919 | 9/1961 | Wetroff et al. | 23—93 XR |
| 3,080,435 | 3/1963 | Nager | 260—673.5 |
| 3,119,881 | 1/1964 | Hodgson | 260—673.5 |
| 3,366,553 | 1/1968 | Bulls et al. | 23—218 XR |

OTHER REFERENCES

Hackh's Dictionary, pp. 39, 506, and 922; 3rd ed. rev. (1944) McGraw-Hill Book Co., Inc., New York, N.Y.

EDWARD STERN, Primary Examiner.

U.S. Cl. X.R.

23—92, 97, 216; 260—486, 668, 669, 673.5, 683.3